United States Patent
Drouin et al.

(10) Patent No.: US 10,066,777 B2
(45) Date of Patent: Sep. 4, 2018

(54) POLYMER FILM FOR THE CONDITIONING OF OIL EXTRACTION PIPES

(75) Inventors: Alexis Drouin, Toulouse (FR); Thomas Charrue, Vendome (FR); Philippe Choffart, Tours (FR)

(73) Assignee: PREMIUM PROTECTOR, Toulouse (FR)

( * ) Notice: Subject to any disclaimer, the term of this patent is extended or adjusted under 35 U.S.C. 154(b) by 376 days.

(21) Appl. No.: 13/820,133

(22) PCT Filed: Sep. 1, 2011

(86) PCT No.: PCT/EP2011/065140
§ 371 (c)(1),
(2), (4) Date: May 9, 2013

(87) PCT Pub. No.: WO2012/028692
PCT Pub. Date: Mar. 8, 2012

(65) Prior Publication Data
US 2013/0213517 A1 Aug. 22, 2013

(30) Foreign Application Priority Data

Sep. 3, 2010 (FR) ..................................... 10 57020
Dec. 30, 2010 (FR) ..................................... 10 61379

(51) Int. Cl.
*B65D 59/06* (2006.01)
*F16L 57/00* (2006.01)
*E21B 17/00* (2006.01)

(52) U.S. Cl.
CPC .............. *F16L 57/00* (2013.01); *B65D 59/06* (2013.01); *E21B 17/006* (2013.01); *F16L 57/005* (2013.01); *Y10T 29/49826* (2015.01)

(58) Field of Classification Search
CPC ........ B65D 59/06; E21B 17/006; F16L 57/00; F16L 57/005
USPC ........................... 138/96 T, 96 R; 285/45, 55
See application file for complete search history.

(56) References Cited

U.S. PATENT DOCUMENTS 1,859,311 A * 5/1932 McEvoy, Jr. ......... F16L 15/001
285/332.3
2,098,087 A 11/1937 Engstrom
2,316,013 A 4/1943 Mulholland
(Continued)

FOREIGN PATENT DOCUMENTS

WO WO 2007063079 A1 * 6/2007 ........... E21B 17/042

OTHER PUBLICATIONS

Biswas et al., Friction and wear of PTFE—a review, Wear, 158, 1992, pp. 193-204, available at <http://www.ewp.rpi.edu/hartford/~peetrm/Other/ME%20Project%20References/PTFE_review.pdf>.*

*Primary Examiner* — Vishal Pancholi
(74) *Attorney, Agent, or Firm* — Womble Bond Dickinson (US) LLP

(57) ABSTRACT

The invention relates to an assembly comprising: an oil extraction pipe (4) having a thread; and a protector (1) for the thread of the extraction pipe (4), said protector (1) including a body and a thread complementary to that of the extraction pipe (4). The assembly is characterised in that it also comprises an elastomer film (60) affixed to the protector and designed to form a sealed connection between the extraction pipe (4) and the protector (1) when the protector (1) is positioned on the extraction pipe (4).

20 Claims, 5 Drawing Sheets

(56) References Cited

U.S. PATENT DOCUMENTS

| | | | | |
|---|---|---|---|---|
| 2,407,553 A * | 9/1946 | Hoesel | ............... | F16B 7/02 |
| | | | | 277/626 |
| 2,523,930 A * | 9/1950 | Unke | ............... | B65D 59/06 |
| | | | | 138/96 T |
| 3,002,770 A * | 10/1961 | Chesnut | ............... | F16J 15/02 |
| | | | | 138/109 |
| 3,687,493 A * | 8/1972 | Lock | ............... | F16L 15/003 |
| | | | | 138/44 |
| 3,780,773 A * | 12/1973 | Haugen | ............... | F16L 39/00 |
| | | | | 138/89 |
| 4,157,100 A * | 6/1979 | Turk | ............... | F16L 57/005 |
| | | | | 138/96 R |
| 4,662,402 A | 5/1987 | Dreyfuss et al. | | |
| 4,674,773 A * | 6/1987 | Stone | ............... | E21B 17/003 |
| | | | | 285/333 |
| 5,452,749 A * | 9/1995 | Johnson | ............... | B65D 59/06 |
| | | | | 138/89 |
| 6,196,270 B1 * | 3/2001 | Richards | ............... | B65D 59/02 |
| | | | | 138/96 R |
| 7,469,721 B2 | 12/2008 | Takano | | |
| 7,571,936 B2 * | 8/2009 | Schneider | ............... | F16B 7/182 |
| | | | | 138/96 R |
| 8,052,173 B2 * | 11/2011 | Carcagno | ............... | E21B 17/042 |
| | | | | 285/333 |
| 2008/0222843 A1 * | 9/2008 | Kovacs | ............... | B65D 59/02 |
| | | | | 16/108 |

\* cited by examiner

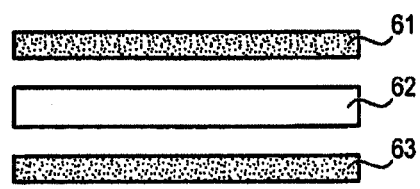
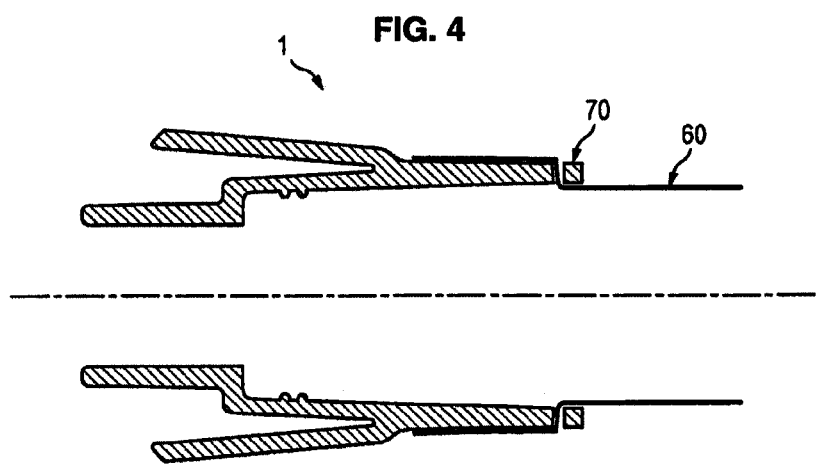

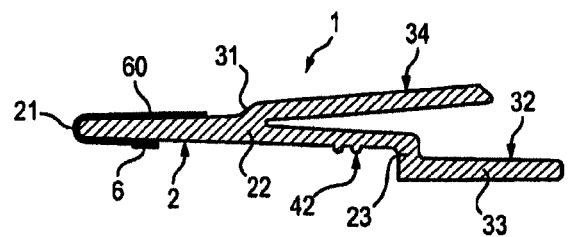
FIG. 5
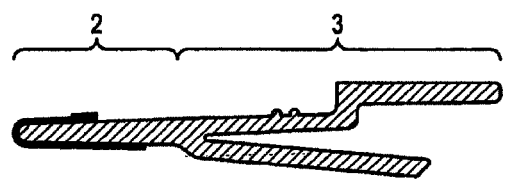
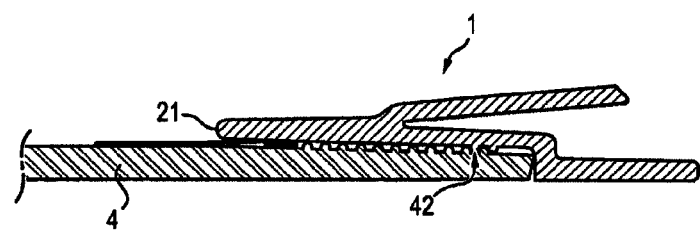
FIG. 6
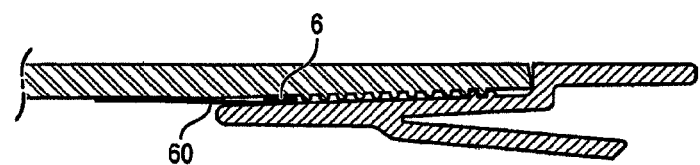

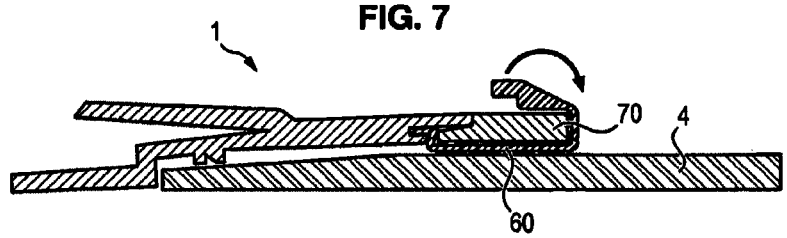
FIG. 7
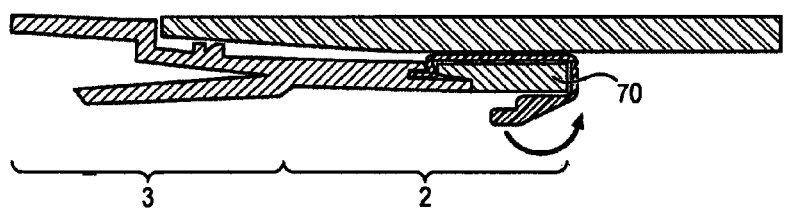
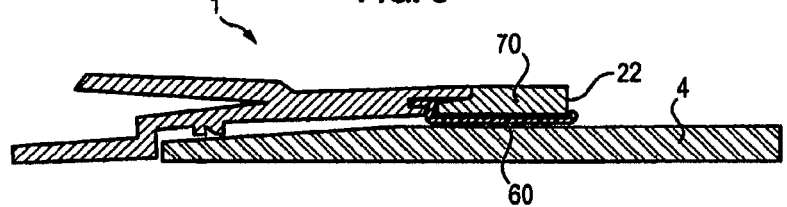
FIG. 8
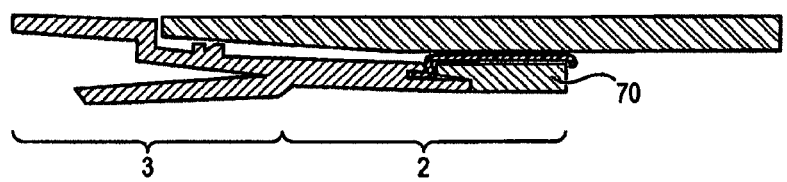

POLYMER FILM FOR THE CONDITIONING OF OIL EXTRACTION PIPES

FIELD OF THE INVENTION

The present invention relates to the field of conditioning oil extraction pipes, and more specifically the means for sealing the protectors for the threads arranged at the ends of said pipes.

STATE OF THE RELATED ART

Oil extraction pipes are used for drilling wells, in order to reach significant depths.

These pipes have, at each of the ends thereof, threads for the interconnection thereof either directly or by means of intermediate elements.

The threaded ends of the pipes are referred to as male ends, whereas the tapped ends of the pipes are referred to as female ends.

According to the practice of those skilled in the art, a protector fitted onto a male end of a pipe is referred to as a male protector (or pin), and a protector fitted onto a female end of a pipe is referred to as a female protection (or box).

Conventionally, these threads were lubricated a first time prior to the storage thereof with so-called storage grease, and again lightly before use, with a lubricant referred to as "operational". This involved significant time consumption for each use of the pipes. Pipes having solid or permanent lubrication means on the threads thereof have thus been proposed, thus with the aim of no longer requiring thread lubrication operations prior to each use of the pipes, the pipes thus being lubricated continuously from the manufacture thereof.

Oil extraction pipes thus require protectors to protect the threaded ends thereof, so that the thread and the lubricant are not damaged during storage and handling during pipe transport.

These protectors must meet numerous requirements:
remaining in position on the pipe despite vibrations due to the transport and handling phases of the pipes,
remaining in position under highly variable temperature conditions, typically from −46° C. to 66° C.,
acting as a shock absorber during the various pipe handling steps,
preventing pollution inside the pipe and the machined areas, i.e. ensuring the tightness of the pipe,
protecting the threaded surfaces against moisture liable to corrode the surfaces and degrade the lubricant;
suitable for being mounted and removed easily,
enabling testing inside the pipe, commonly referred to as "drift", giving rise to the possibility of opening the protector at the end thereof by means of a cap system requiring no unnecessary screwing or unscrewing of the protector body,
enabling gripping, if required, of the pipe by hooks housed in the ends of the pipe.

The API 5CT standard, also referred to as ISO 11960, defines the requirements to be met by these protectors more specifically.

The use of solid lubricants adds an additional requirement in respect of non-degradation of the lubricant when fitting or removing the protector.

The unpublished patent application FR 1057020 describes an enhanced protector for threaded ends of extraction pipes.

This enhanced protector may have a plurality of male or female alternative embodiments, so as to be fitted to various pipe ends.

In the male alternative embodiment thereof, the protector is advantageously associated with means for ensuring the tightness of the connection between the protector and the pipe.

These means typically have specific properties, particularly so as to ensure sufficient tightness without degrading the lubricant situated on the thread during the positioning and removal thereof.

DESCRIPTION OF THE INVENTION

The aim of the present invention is that of providing means for producing a tight connection between an oil extraction pipe and a protector for a thread of such a pipe.

For this purpose, the invention relates to an assembly comprising:
an oil extraction pipe equipped with a thread;
a protector for said thread of the extraction pipe, said protector comprising a body and a female thread, which is typically discontinuous, complementary to the thread of said extraction pipe,
said assembly being characterised in that it further comprises an elastomer film attached to said protector, and suitable for producing a tight connection between the extraction pipe and the protector when said protector is positioned on the extraction pipe.

According to particular embodiments, said elastomer film is:
a single-layer urethane ester type film, or
a tri-layer film comprising two external layers and one median layer, of ethylene propylene diene monomer composition on the two external layers and ethylene methyl acrylate on the internal layer, and
a bi-layer film consisting of a first layer of elastane and polyhexamethylene adipamide in 20%/80% proportions and a second urethane ester type layer.

According to one alternative embodiment, said film has a thickness between 0.001 mm and 5 mm.

According to one alternative embodiment, said film is attached to the protector by bonding or by means of a ring welded to said protector.

According to one particular alternative embodiment, the protector has a substantially frustoconical section having an internal wall, and the film is bonded on the internal wall of said protector.

According to one particular embodiment, the film has a coefficient of friction between 0.05 and 0.5.

According to one alternative embodiment, the film forms a sleeve having a length between 15 and 30 cm, or such that the ratio of the length of the sleeve by the diameter of the extraction pipe is between 0.5 and 10. According to one particular embodiment, the film forms a sleeve having a first end attached to the protector, and a second free end, said sleeve having, on at least part of the length thereof, a resting diameter less than the external diameter of the pipe.

The invention also relates to a process for assembling such an assembly, comprising the following steps:
rolling back the free portion of the sleeve on the protector on the external wall of the protector;
positioning the protector on the extraction pipe,
positioning the sleeve on a section of the external wall of the pipe.

The invention further relates to a process for manufacturing an oil extraction pipe thread protector, said process comprising the following steps:

manufacturing the protector by means of polycarbonate injection-moulding, arranging an elastomer film between one end of the protector and a ring;

attaching the ring on the protector so as to permanently enclose the elastomer film between the protector and the ring.

DESCRIPTION OF THE FIGURES

Further features, aims and advantages of the invention will emerge from the description hereinafter, which is merely illustrative and not limiting, and should be read with reference to the appended figures, wherein:

FIG. 3 shows an example of elastomer film structure according to one particular embodiment;

FIG. 4 shows an example of attachment of elastomer film on a male protector by means of a ring;

FIGS. 5, 6, 7 and 8 show sectional views of the positioning of a male protector equipped with an elastomer film on an extraction pipe;

DETAILED DESCRIPTION

Figure 1:
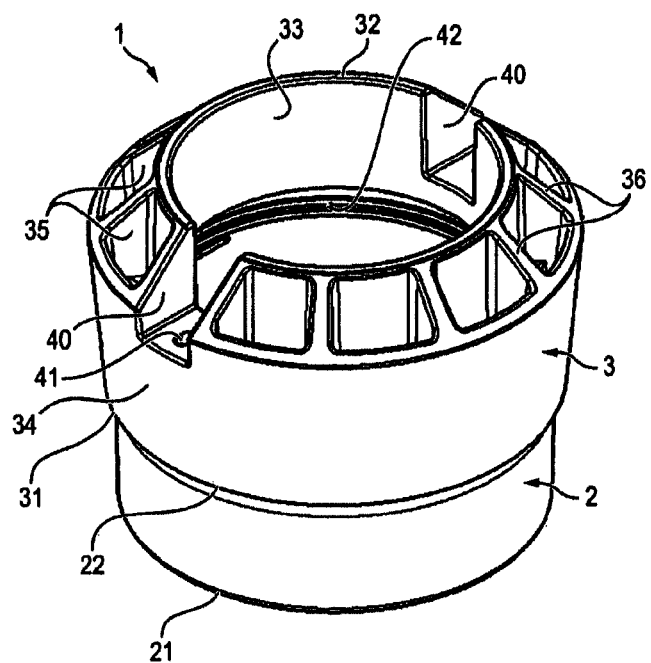
FIGS. 1 and 2 show a male alternative embodiment of an oil extraction pipe protector.

Male Protector:

FIG. 1 shows an example of an embodiment of a male protector 1 according to the invention.

The male protector 1 as illustrated can be broken down into two parts:

a connecting segment 2, and a bumper segment 3.

The connecting segment 2 has a proximal end 21 and a distal end 22, and has a substantially frustoconical shape wherein the diameter decreases from the proximal end 21 to the distal end 22.

The bumper segment 3 has a connecting end 31 and a free end 32, the connecting end 31 thereof being in the extension of the distal end 22 of the connecting segment 2.

The bumper segment 3 comprises an internal ring 33 and an external ring 34, these two rings 33 and 34 being concentric and defining an internal space 35 therebetween.

The internal ring 33 as shown comprises a frustoconical portion in the extension of the distal end 22 of the connecting segment 2, and a portion having a hollow cylindrical shape in the extension of said frustoconical portion, the diameter of this cylindrical section being substantially equivalent to the internal diameter of the pipe whereon the male protector is to be positioned.

The internal ring 33 is thus typically radially offset with respect to the frustoconical connecting segment 2 and thus typically comprises a connecting partition 23, shown in FIG. 5 which will be detailed hereinafter, said connecting partition 23 being arranged between the frustoconical portion and the cylindrical portion of the internal ring 33.

The external ring 34 has a frustoconical section, wherein the diameter increases from the connecting end 31 to the free end 32 of the connecting segment 3, the maximum diameter of the external ring 34 being greater than the maximum diameter of the connecting segment 2. The external ring 34 thus typically has an angle of 5° with respect to the axis of the male protector 1.

The male protector 1 illustrated has two grooves 40 extending along a diameter of the male protector 1, from the free end 32.

These grooves 40 are suitable for enabling the insertion of a tool for screwing and unscrewing the protector on a pipe.

Furthermore, these grooves 40 have apertures 41 provided on one of the walls thereof, these apertures 41 being intended to enable the attachment of a substantially circular cap typically blocking off the free end 32 of the male protector 1.

Figure 2:
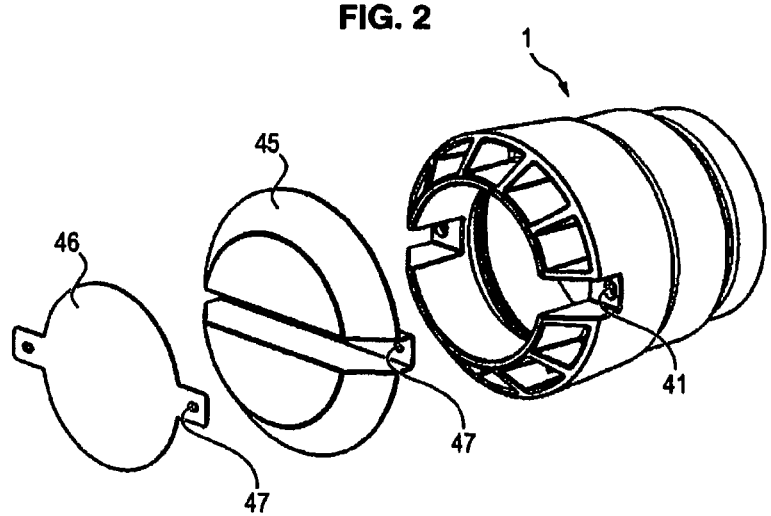

FIG. 2 shows the male protector 1 described above, along with two embodiments of such caps 45 and 46.

In these two embodiments 45 and 46, the caps comprise complementary projections 47 to the apertures 41 of the male protector 1, so as to be held in position at the free end 32 thereof.

The embodiment 45 of the cap covers the entire free end 32, and has a diameter corresponding to the maximum diameter of the male protector 1.

The embodiment 46 merely blocks off the opening defined by the internal ring 33, and thus has a diameter corresponding substantially to the internal diameter of said internal ring 33.

In the embodiment illustrated, the male protector 1 comprises longitudinal ribs 36 connecting the internal ring 33 and the external ring 34, and thus segmenting the internal space 35 between the internal ring 33 and the external ring 34 into multiple compartments.

As represented in the figure, the male protector 1 comprises twelve longitudinal ribs 36, the sides of each of the grooves 40 are defined by two ribs 36, and the remaining ribs 36 are distributed substantially uniformly between the internal ring 33 and the external ring 34.

As illustrated, the free end 32 of the male protector 1 is bevelled to substantially 45%, resulting in a retraction of the diameter towards the free end 32. This 45% inclination makes it possible to increase the shock resistance of the male protector 1 and thus protect the pipe whereon it is to be mounted more effectively than a protector having a right-angled free end 32.

The male protector 1 further comprises threads 42 arranged at the internal wall of the connecting segment 2, these threads 42 being suitable for engaging with the threads of a pipe whereon said male protector 1 is to be assembled. These threads 42 form a male thread, are typically produced by tapping, and are advantageously discontinuous.

The threads 42 of the male protector 1 typically comprise one, two or three turns, with further alternative embodiments being obviously possible.

Having a small number of turns makes it possible to limit the impact on the lubricant of the threads of the pipe that the male protector 1 is intended to protect, this number of turns being however chosen so as to secure the male protector 1 sufficiently on the pipe.

Manufacture:

The male protector 1 is made of polycarbonate by injection-moulding.

The specific geometry of the protector 1 offers significant advantages for the manufacture thereof by injection-moulding. Indeed, all the walls of the protector 1 have a substantially equal thickness, including the walls of the bumper segment 3 due to the presence of the ribs 36.

This substantially constant thickness for the entire male protector makes it possible to:

prevent shrinkage cavities,
reduce the quantity of material required,
reduce the solidification time significantly in relation to an equivalent part where the bumper segment 3 would be produced in a "solid" piece, thus making it possible to reduce machine use considerably by reducing the cycle time for producing the male protector 1, thus making it possible to save energy and obtain a higher production rate;
preventing so-called hot spots which are stress concentration points and mechanically weak points.

In this way, the protector 1 as shown has a lower production cost in relation to a protector having an equivalent overall shape, but wherein the bumper segment 3 is "solid".

Furthermore, all the connections and edges advantageously have fillets or curves so that the protector 1 comprises no sharp angles, favouring mould release. Moreover, not comprising sharp angles makes it possible to prevent risks of damage to the film described hereinafter.

Polycarbonate is a very high-performance material for producing the protector 1, the injection-moulding whereof is enabled due to the specific shape of the protector.

Furthermore, polycarbonate is a transparent material, enabling the user to inspect the condition of the pipe threads whereon the protector 1 is positioned directly, without the need to remove the protector 1 to conduct such an inspection.

This easy inspection makes it possible to prevent risks of degradation of the lubrication of the threads of the pipe at each removal and repositioning of the protector 1.

Moreover, the protector 1 is advantageously subjected to a surface treatment, so as to perform ultraviolet and/or infrared filtering, such a treatment typically consisting of soaking, followed by microwave plasma treatment in the presence of ozone.

The material from which the protector 1 is formed, typically polycarbonate, can be chosen so as to have such ultraviolet and/or infrared filtering characteristics.

The solid lubricants used on the pipe threads are indeed ultraviolet- and infrared-sensitive, and thus should be protected therefrom.

In this way, the male protectors 1 proposed are suitable for effectively protecting the threaded ends of an oil extraction pipe, by producing a tight connection while enabling the various pipe handling and inspection operations, and retaining a reasonable production cost due to the specifically suitable shape thereof for injection-moulding.

Elastomer Film:

The male protector 1 as represented in FIG. 1 is typically associated with an elastomer film 60.

Structure of the Elastomer Film 60:

The elastomer film 60 is typically an elastomer film comprising one or a plurality of layers, and advantageously all or some of the following properties:
having a face having a very low adherence, this surface being that intended to come into contact with the pipe, so as to limit friction on the pipe threads when the protector 1 is removed from the pipe and thus not degrade the lubricant when removing the protector; this very low adherence is typically obtained by adding a slip agent, for example the Erucamide molecule in a proportion between 0.1 and 50% of the overall structure;
being retractable/extensile, so as to enable both the rolling back thereof on the protector prior to the positioning of the protector 1 on the pipe, and the rolling out or folding down thereof on the external face of the pipe once the protector 1 has been positioned on said pipe, while ensuring the tightness of the connection in spite of a smaller diameter than that of the pipe;
being suitable for self-welding;
being impervious to moisture;
having sufficient mechanical properties so that the film is not torn during the steps for positioning the film on the protector and the protector 1 on the pipe, more specifically the film has a high resistance to twisting and shearing.

According to a first advantageous embodiment, the elastomer film is a single-layer urethane ester type film, for example, the film marketed using the reference Vacfilm 430 by Richmond Aerovac.

The film has an effective thickness typically between 0.001 mm and 5 mm, for example between 100 and 200 μm, typically in the region of equal to 100 or 200 μm.

According to a second embodiment, the elastomer film is a tri-layer film of EPDM (ethylene propylene diene monomer) composition on the external layers, and EMA (ethylene methyl acrylate) on the internal layer.

The film has an effective thickness typically between 0.001 mm and 5 mm, for example in the region of or equal to 200 μm.

A slip additive, for example the Erucamide molecule in a proportion between 0.1 and 50% of the mass of the EPDM is typically added to the EPDM so as to reduce the adherence thereof, for example to obtain a coefficient of friction between 0.05 and 0.80.

FIG. 3 schematically illustrates the structure of the film 60, with three overlaid layers:
the first external layer 61 which is the layer intended to come into contact with the pipe, and is typically made of EPDM to which a slip additive is advantageously added;
the second median layer 62 is the layer intended to add flexibility to the overall film, and is typically made of EMA. This layer does not contain slip agent, which particularly makes it possible to ensure compatibility between the layers;
the third external layer 63, which is the layer intended to be in contact with the protector 1, is for example also made of EPDM to which a slip additive is advantageously added.

The film 60 thus has the following properties:
Elongation percentage typically between 50% and 1500%, typically between 200 and 800%, and more particularly between 300 and 600%;
Coefficient of friction between 0.05 and 0.8;
Thickness between 50 μm and 300 μm;
Suitability for welding from 105° C. at 330 bar for 1 second.

The coefficient of friction, also referred to as the friction coefficient, is defined by Coulomb's law, which defines for two solids sliding in respect to each other, T f×N, where:
T is the tangential composition of the friction forces applied at the contact between the two solids, which opposes or tends to oppose sliding,
N is the normal components of the friction forces applied at the contact between the two solids, which presses them against each other.

In order to obtain a film with the desired properties, linear or low-density polymers, for example, are used, suitable for obtaining a flexible film.

Moreover, low-density semi-crystalline polymers have a greater amorphous phase, and are thus suitable for superior additive control since fillers are lodged in the amorphous phase.

According to a third embodiment, the elastomer film is a bi-layer film consisting of a first layer of elastane, for example made of a material marketed under the name Lycra (third-party registered trademark), or a mixture of elastane and polyhexamethylene adipamide, marketed under the name nylon (third-party registered trademark), for example in 20%/80% proportions, and a second urethane ester type layer, for example, the film marketed under the reference Vacfilm 430 by Richmond Aerovac.

The bi-layer film formed has an effective thickness typically between 0.001 mm and 5 mm, for example in the region of or equal to 1050 μm, corresponding to 1000 μm of the first layer of Lycra and 50 μm of the second layer.

Attachment of the Elastomer Film 60 on the Protector 1:

The elastomer film 60 is shaped so as to form a tube or a sleeve, and is attached to the male protector 1.

This attachment may for example be carried out by bonding the film 60 directly on the protector 1, or by welding or embedding a ring on the protector 1 so as to enclose the film 60.

In the case of attachment by bonding, the following steps may be carried out:
  cutting the elastomer film into strips, typically having dimensions in the region of 130 mm by 330 mm, or more generally a width between 100 and 200 mm and a length between 300 and 360 mm;
  welding the film so as to form a sleeve, typically by butt-jointing two edges of a strip of film and welding same, so as to avoid forming an additional thickness, the sleeve formed having a length typically between 15 and 30 cm;
  positioning the sleeve formed on an inflatable elastomer cylinder, and positioning the cylinder inside a male protector;
  pre-blowing the elastomer cylinder, until it is in contact with the sleeve;
  adding an adhesive strip, typically adding adhesive by adhesive transfer on the entire periphery of the sleeve, this adhesive strip having for example a width less than or equal to 50 mm;
  continuing to inflate the elastomer cylinder until contact between the film and the protector and thus creating excess pressure, typically in the region of 2 bar, for a given time, for example one minute, so as to assemble the elastomer film 60 and the protector 1, typically on the internal wall of a frustoconical section of the protector 1 in the case of the particular embodiment described above;
  deflating the elastomer cylinder and removing same from the assembly formed.

The adhesive is chosen such that the attachment of the polymer film 60 on the male protector 1 is permanent, i.e. that the polymer film 60 cannot be removed from the male protector without being damaged, unlike a removable attachment.

According to a further alternative embodiment, the elastomer film 60 may be attached to the protector 1 by means of a ring 70 welded to the protector 1.

FIG. 4 illustrates schematically a sectional view of an assembly consisting of a protector 1 and an elastomer film 60 attached to the protector by means of such a ring 70.

In this embodiment, the attachment of the film 60 on the protector 1 may comprise the following steps:

cutting the film into strips, typically having dimensions in the region of 130 mm by 330 mm, or more generally a width between 100 and 300 mm and a length between 300 and 360 mm, these dimensions typically corresponding to the circumference of a 4"½ diameter pipe; further dimensions optionally being used;
welding the film so as to form a sleeve, typically by butt-jointing two edges of a strip of film and welding same, so as to avoid forming an additional thickness, the sleeve formed having a length typically between 15 and 30 cm;
producing a ring 70, for example a polycarbonate fluted ring, typically by injection-moulding, having for example an internal diameter of 114 mm;
arranging the film 60 between the protector 1 and the ring 70, typically at the proximal end 21 of the protector 1;
attaching the ring 70 on the protector 1, typically by ultrasonic welding or embedding.

The elastomer film 60 is thus permanently attached to the protector 1.

Alternatively, the film 60 may be pre-attached to the ring 70 prior to the positioning thereof on the protector 1, so as to facilitate the positioning thereof.

The sleeve made of elastomer film 60 typically has a length between 15 and 30 cm, or for example a length such that the ratio of the length of the sleeve by the diameter of the extraction pipe is between 0.5 and 10.

Once attached to the male protector 1, the elastomer film 60 is rolled back around the proximal end 21 so as to cover the external wall of the male protector 1, as illustrated in FIG. 5.

The sleeve typically has a first end attached to the protector 1 and a second free end.

According to one particular embodiment, the elastomer film 60 is sized and has extensile properties such that the sleeve has, on at least part of the length thereof, a resting diameter (when not stretched) less than the external diameter of the pipe 4, the sleeve being suitable for being stretched for the positioning thereof and rolling back thereof on the protector 1.

The male protector 1 is then positioned on an oil extraction pipe, typically by screwing same at one end of the pipe. During this positioning, the elastomer film slips on the pipe thread, without degrading the lubricant thereof due to the properties of the elastomer film 60, particularly the adherence thereof and the coefficient of friction thereof.

According to a first alternative embodiment, the part of the elastomer film 60 which was rolled back on the external face of the male protector 1 is subsequently rolled out or folded down so as to cover a part of the pipe, typically a length between 15 and 30 cm. The sleeve thus encloses the pipe 4 due to the fact that the diameter thereof is less than the external diameter of the pipe 4.

FIG. 6 shows a schematic drawing of a male protector 1 positioned on a threaded pipe 4, the elastomer film 60 being rolled out on a part of the threaded pipe 4.

According to a further embodiment, the part of the elastomer film 60 which was rolled back on the external face of the male protector 1 is subsequently separated from the part of the elastomer film 60 attached to the protector 1, typically by tearing or cutting. This separation of the elastomer film 60 is advantageously carried out substantially from the proximal end 22 of the connecting segment 2 of the protector 1. Once this separation has been carried out, the part of the elastomer film 60 attached to the protector 1 shrinks on the thread pipe 4 due to the fact that the diameter thereof is less than the external diameter of the pipe 4.

The elastomer film 60 thus advantageously has one or a plurality of precuts, to facilitate the separation thereof.

FIGS. 7 and 8 show a schematic drawing of a male protector 1 positioned on a threaded pipe 4, the elastomer film 60 being cut or torn at the proximal end 22 of the connecting segment 2 of the protector 1.

FIG. 7 shows the tearing or cutting of the elastomer film 60, and FIG. 8 shows the cut or torn elastomer film 60, enclosing the threaded pipe 4. In the embodiment shown in FIG. 7, the elastomer film is attached to the protector 1 by means of a ring 70 thus forming the proximal end 22 of the protector 1.

Figure 9:
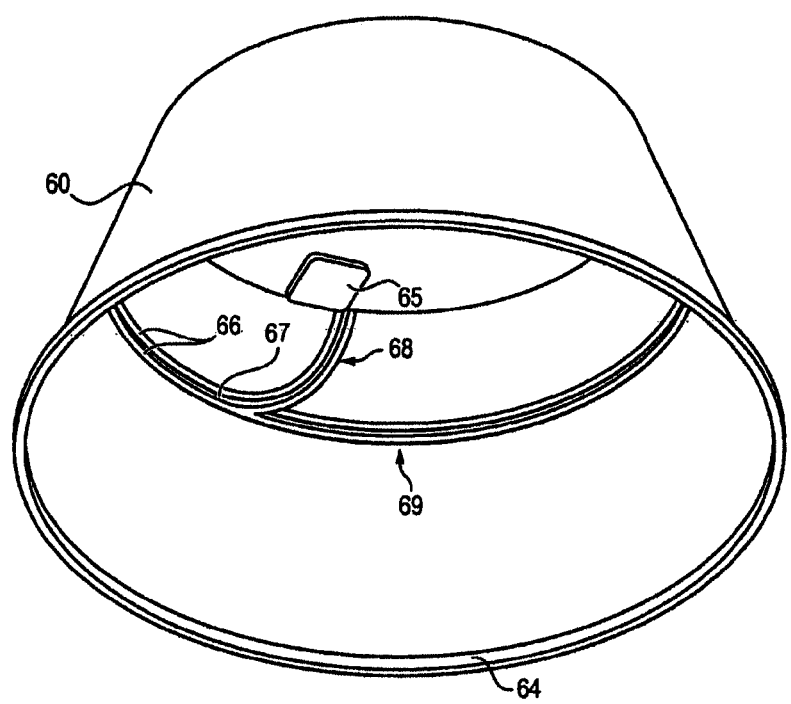
FIG. 9 shows an example of a particular embodiment of an elastomer film sleeve.

FIG. 9 shows an example of a sleeve made of elastomer film 60, suitable for being attached to a male protector 1 via a first end 64, the opposite end thus being suitable for being rolled back on the protector 1 as described above. The elastomer film 60 forms a sleeve comprising a strip 65 and two ribs 66 so as to define a precut area 67 between these two ribs. The user may then pull the strip 65, causing the elastomer film 60 to tear at the precut area 67 situated between the two areas of increased thickness defined by the two ribs 66, firstly along a substantially longitudinal portion 68, and then along a circular portion 69 suitable for separating the elastomer film 60.

In this way, the elastomer film 60 seals the connection between the male protector 1 and a pipe whereon it is attached at the proximal end 21 of the male protector 1, without the affecting the lubrication of the thread of the pipe whereon the protector is attached.

The invention claimed is:

1. Assembly comprising:
an oil extraction pipe (4) equipped with a male thread and lubricant on said thread;
a protector (1) for said thread of the extraction pipe (4), said protector (1) comprising a body and a female thread, complementary to the male thread of said extraction pipe (4) and configured to protect said male thread and said lubricant during storage and handling of said pipe,
an elastomer film (60) attached to said female thread of said protector, and configured to produce a removably tight connection between the extraction pipe (4) and the protector (1) when said protector (1) is positioned on the extraction pipe (4)
wherein the elastomer film is a tube having a length between 15 and 30 cm, said tube having a first end attached to the protector and having a second end corresponding to a free portion having a diameter thereof which is less than the external diameter of the extraction pipe, the elastomer film being extensile so as to enable rolling back of the free portion of the tube on the external wall of the protector when the protector is positioned upon the male thread of the extraction pipe and being retractable so as to enable a subsequent rolling out and folding down so that the part of the tube outside the protector covers a part of the extraction pipe.

2. Assembly according to claim 1, wherein said elastomer film (60) is a single-layer urethane ester type film.

3. Assembly according to claim 1, wherein said elastomer film (60) is a tri-layer film comprising two external layers (61, 63) and one median layer (62), of ethylene propylene diene monomer composition on the two external layers (61) and ethylene methyl acrylate on the median layer (62).

4. Assembly according to claim 1, wherein said film (60) is a bi-layer film consisting of a first layer comprising 20% elastane and 80% polyhexamethylene adipamide, and a second urethane ester type layer.

5. Assembly according to claim 1, wherein said film (60) has a thickness between 0.001 mm and 5 mm.

6. Assembly according to claim 1, wherein said film has a coefficient of friction between 0.05 and 0.5.

7. Assembly according to claim 1, wherein said film (60) is attached to the protector (1) by bonding.

8. Assembly according to claim 1, wherein the protector (1) has a substantially frustoconical section having an internal wall, and the film (60) is bonded on the internal wall of said protector (1).

9. Assembly according to claim 1, wherein the film (60) is attached to the protector (1) by means of a ring (70) attached to said protector (1).

10. Assembly according claim 1, wherein said film (60) forms a sleeve having a length such that the ratio of the length of the sleeve by the diameter of the extraction pipe (4) is between 0.5 and 10.

11. Assembly according to claim 1, wherein said film (60) is suitable for self-welding and impervious to moisture.

12. Assembly according to claim 2, wherein the film (60) is attached to the protector (1) by means of a ring (70) attached to said protector (1).

13. Assembly according to claim 3, wherein the film (60) is attached to the protector (1) by means of a ring (70) attached to said protector (1).

14. Assembly according to claim 4, wherein the film (60) is attached to the protector (1) by means of a ring (70) attached to said protector (1).

15. Assembly according to claim 5, wherein the film (60) is attached to the protector (1) by means of a ring (70) attached to said protector (1).

16. Assembly according to claim 6, wherein the film (60) is attached to the protector (1) by means of a ring (70) attached to said protector (1).

17. Assembly according to claim 2, wherein the film (60) is attached to the protector (1) by means of a ring (70) attached to said protector (1).

18. Assembly comprising:
an oil extraction pipe (4) equipped with a male thread and lubricant on said thread;
a protector (1) for said thread of the extraction pipe (4), said protector (1) comprising a body and a female thread, complementary to the male thread of said extraction pipe (4) and configured to protect said male thread and said lubricant during storage and handling of said pipe,
an elastomer film (60) attached to said female thread of said protector, and configured to produce a removably tight connection between the extraction pipe (4) and the protector (1) when said protector (1) is positioned on the extraction pipe (4)
wherein the elastomer film is a tube made in a material impervious to moisture having a length between 15 and 30 cm, said tube being provided with a slip agent on its internal face so as to have a very low adherence with a slip coefficient between 0.05 and 0.80 to limit friction on the extraction pipe threads when the protector is removed from the extraction pipe and thus not degrade the lubricant when removing the protector, said tube having a first end attached to the protector and having a second end corresponding to a free portion having a diameter thereof which is less than the external diameter of the extraction pipe, the elastomer film being extensile so as to enable rolling back of the free portion of the tube on the external wall of the protector when the protector is positioned upon the male thread of the extraction pipe and being retractable so as to enable a subsequent rolling out and folding down so as to cover a part of the extraction pipe while ensuring a tightness upon said extraction pipe.

19. Assembly comprising:
- an oil extraction pipe (4) equipped with a male thread and lubricant on said thread;
- a protector (1) for said thread of the extraction pipe (4), said protector (1) comprising a body having an internal wall provided with a discontinuous female thread comprising between one to three turns, complementary to the male thread of said extraction pipe (4) and configured to protect said male thread and said lubricant during storage and handling of said pipe,
- an elastomer film (60) attached to said female thread of said protector, and configured to produce a removably tight connection between the extraction pipe (4) and the protector (1) when said protector (1) is positioned on the extraction pipe (4)

wherein the elastomer film is a tube made in a material impervious to moisture having a length between 15 and 30 cm and an effective thickness between 0.001 mm and 5 mm, said tube being provided with a slip agent on its internal face so as to have a very low adherence with a slip coefficient between 0.05 and 0.80 to limit friction on the extraction pipe threads when the protector is removed from the extraction pipe and thus not degrade the lubricant when removing the protector, said tube having a first end attached to the internal wall of the protector and having a second end corresponding to a free portion having a diameter thereof which is less than the external diameter of the extraction pipe, the elastomer film being extensile with an elongation percentage between 50% and 1500% so as to enable rolling back of the free portion of the tube on the external wall of the protector when the protector is positioned upon the male thread of the extraction pipe and being retractable so as to enable a subsequent rolling out and folding down so as to cover a part of the extraction pipe.

20. Assembly comprising:
- an oil extraction pipe (4) equipped with a male thread and lubricant on said thread;
- a protector (1) for said thread of the extraction pipe (4), said protector (1) comprising a body and a female thread, complementary to the male thread of said extraction pipe (4) and configured to protect said male thread and said lubricant during storage and handling of said pipe,
- an elastomer film (60) attached to said female thread of said protector, and configured to produce a removably tight connection between the extraction pipe (4) and the protector (1) when said protector (1) is positioned on the extraction pipe (4)

wherein the elastomer film is a tube made in a material impervious to moisture having a length between 15 and 30 cm, said tube being provided with a slip agent on its internal face so as to have a very low adherence with a slip coefficient between 0.05 and 0.80 to limit friction on the extraction pipe threads when the protector is removed from the extraction pipe and thus not degrade the lubricant when removing the protector, said tube having a first end attached to the protector and having a second end corresponding to a free portion having a diameter thereof which is less than the external diameter of the extraction pipe, the elastomer film being extensile so as to enable rolling back of the free portion of the tube on the external wall of the protector when the protector is positioned upon the male thread of the extraction pipe and being retractable so as to enable a subsequent rolling out and folding down so as to cover a part of the extraction pipe while ensuring a tightness upon said extraction pipe, and wherein the free portion of the elastomer film is provided with a plurality of precuts, to facilitate separation of a part of said free portion by tearing or cutting after said free portion of the elastomer film was rolled back on the external face of the male thread of the extraction pipe allowing the part of the elastomer film attached to the protector to shrink on the extraction pipe due to the fact that the diameter thereof is less than the external diameter of the extraction pipe.

* * * * *